United States Patent [19]

Andersson

[11] Patent Number: 5,489,472
[45] Date of Patent: Feb. 6, 1996

[54] PACKAGING MATERIAL WITH GOOD GAS BARRIER PROPERTIES AND ALSO PACKAGING CONTAINER MANUFACTURED FROM THE MATERIAL

[75] Inventor: Thorbjörn Andersson, Södra Sandby, Sweden

[73] Assignee: Tetra Laval Holdings & Finance S.A., Pully, Switzerland

[21] Appl. No.: 214,665

[22] Filed: Mar. 18, 1994

Related U.S. Application Data

[63] Continuation of Ser. No. 782,305, Oct. 24, 1991, abandoned.

[30] Foreign Application Priority Data

Nov. 7, 1990 [SE] Sweden .................................. 9003544

[51] Int. Cl.⁶ ...................................................... B32B 3/26
[52] U.S. Cl. ................... 428/314.2; 428/317.5; 428/317.7; 428/319.1
[58] Field of Search ................................ 428/317.1, 317.5, 428/317.7, 319.1, 314.2, 910

[56] References Cited

U.S. PATENT DOCUMENTS

| | | | |
|---|---|---|---|
| 4,234,647 | 11/1980 | Murphy et al. | 428/220 |
| 4,321,297 | 3/1982 | Adelman | 428/238 |
| 4,331,725 | 5/1982 | Akao | 428/138 |
| 4,424,260 | 1/1984 | Pupp | 428/461 |
| 4,511,078 | 4/1985 | Rauser et al. | 229/198.2 |
| 4,565,733 | 1/1986 | Akao | 428/215 |
| 4,590,126 | 5/1986 | Andersson | 428/349 |
| 4,594,292 | 6/1986 | Nagai et al. | 428/458 |
| 4,994,310 | 2/1991 | Frisk et al. | 428/34.2 |

FOREIGN PATENT DOCUMENTS

1215137  12/1970  United Kingdom .............. 428/317.5

Primary Examiner—George F. Lesmes
Assistant Examiner—Blaine R. Copenheaver
Attorney, Agent, or Firm—Burns, Doane, Swecker & Mathis

[57] ABSTRACT

Packaging material with good gas barrier properties comprising a skeletal layer and a gas barrier layer of a material with low elasticity, e.g. Al foil, which is placed against one side of the skeletal layer and which is bound to the skeletal layer with the aid of an intermediate layer of binding agent.

The layer of binding agent consists of a compressible material, preferably an expanded or foamed polyolefin, which is arranged to compress with the aim of reducing the tensile strains acting on the Al foil when the material is shaped by folding during manufacture of the packaging.

15 Claims, 2 Drawing Sheets

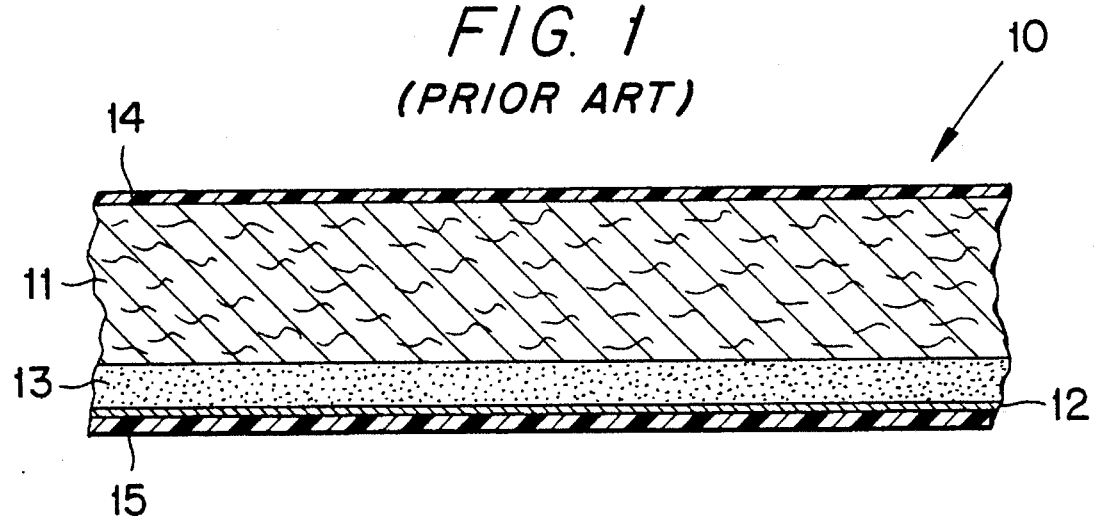
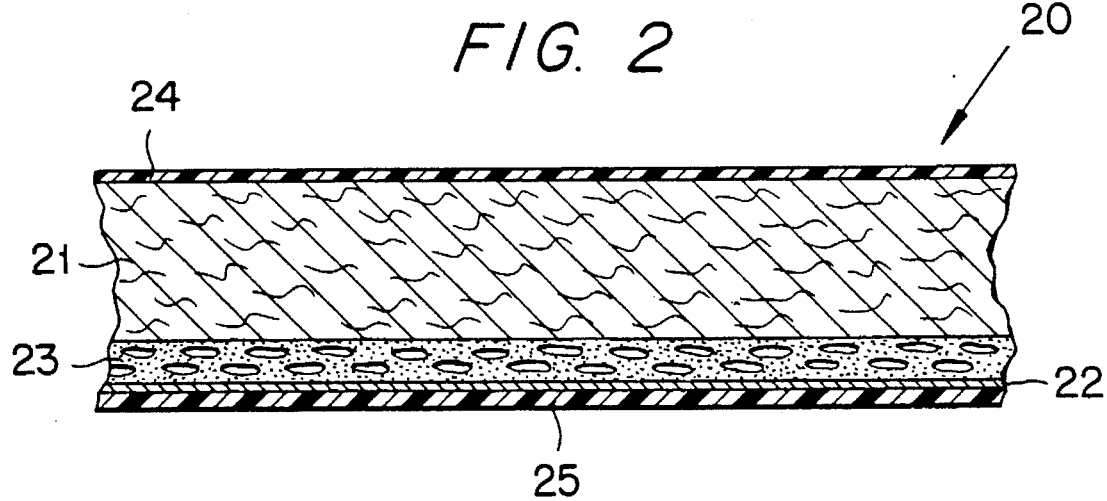

PACKAGING MATERIAL WITH GOOD GAS BARRIER PROPERTIES AND ALSO PACKAGING CONTAINER MANUFACTURED FROM THE MATERIAL

This application is a continuation of application Ser. No. 07/782,305, filed Oct. 24, 1991, now abandoned.

BACKGROUND OF THE INVENTION

The present invention concerns a packaging material with good gas barrier properties comprising a skeletal layer and a gas barrier layer of a material with low elasticity which is placed against one side of the skeletal layer and which is bound to the skeletal layer with the aid of a layer of a binding agent placed between the skeletal layer and the gas barrier layer. The invention in addition concerns a packaging container manufactured from the packaging material through shaping by folding and sealing.

DESCRIPTION OF RELEVANT ART

Liquid foods of the type such as juice, wine and similar food products with comparable sensitivity to oxidation and storage are now most frequently packaged and transported in finished portion packagings of disposable character among which a very large group is manufactured from a laminated paper or cardboard material. The composition of the packaging material sets out from the idea of creating the best possible chemical and mechanical protection for the packaged product at the same time as it must also make the packaging sufficiently strong and stable in form to be able to handle it conveniently without it being deformed or damaged.

In order to give the packaging the necessary mechanical strength and stability of form the packaging material is most frequently provided with a skeletal layer of paper or cardboard which gives the material the desired rigidity of form and at the same time a sufficient degree of flexibility to be able to be converted into a packaging through shaping by folding. In order to protect the skeletal layer against liquids and other moisture which could easily be absorbed by the moisture sensitive skeletal layer and make the material limp and impossible to handle, the material is provided with outer coatings of plastic, preferably polyethylene.

A packaging material consisting simply of paper or cardboard and plastic has, however, no sealing properties against gases and can therefore not be used in packagings for products of the type mentioned above, since oxygen could easily penetrate into the packaging and already a very short time after the day of packaging spoil the quality of the packaged oxygen sensitive product or cause it to deteriorate. It has therefore previously been proposed to supplement the known packaging material with a further layer of a material with good gas barrier properties, with one of the proposals having taken as a starting point the use as a gas barrier of a thin aluminum foil (Al foil) bound to one side of the skeletal layer. Another proposal has taken as a starting point the use, instead of Al foil, of gas-tight layer of polymer material, e.g. ethyl vinyl alcohol (EVOH), polyamide (PA) and polyester (PET), which have been bound in a suitable manner to one side of the skeletal layer with the aid of an intermediate layer of a binding agent.

Among the abovementioned layers serving as a gas barrier in the known packaging materials Al foil has proved to be the most superior alternative from the gas-tight point of view at the same time as Al foil has also given the packaging material other valuable properties from the product protection point of view, e.g. impenetrability to light. An Al foil is practically completely impenetrable for gases and light, but is of too low elasticity to be able to withstand the tensile stresses to which the packaging material is exposed during manufacture of the packaging and which are particularly accentuated in the area where double or multiple layers of packaging material must be folded in crossing fold directions, the so-called cross. In these particularly exposed areas it therefore not infrequently happens that the tensile stresses on the Al foil become so great that the Al foil cracks or bursts with losses of seal and risks of leakage as a result in the finished packaging. The problem, which is partly connected with the thickness of the Al foil and to a certain extent can be mastered by making the Al foil thicker, is due to the fact that the Al foil together with other layers placed outside the Al foil, reckoned in a direction away from the line of the fold, is forced to cover a longer distance than the one corresponding to the length of the Al foil or the aforesaid outer layers in the flat, unfolded state. The Al foil together with these outer layers will therefore be exposed to tensile stresses corresponding to those which are required to stretch the layers of material the "excess distance" caused by the folding. The plastic layers situated on the outside of the Al foil are as a rule sufficiently elastic to be able to be stretched the extra fold distance, while the Al foil on the other hand only has a low elasticity and therefore often cracks or bursts when double or multiple layers of material are folded along two crossing fold directions with the Al foil placed against the side of the skeletal layer which is facing away from the line of the fold.

A way of avoiding bursts and crack formation in the Al foil has taken as a starting point the reduction of the thickness of the skeletal layer locally through removal of material, e.g. milling and grinding, in such double or multiple fold areas in order to bring the Al foil more nearly fold-centered with the aim of reducing the tensile stresses on the Al foil. This known solution works well to a certain extent in practice and makes possible the manufacture of packagings shaped by folding with good gas-tight properties, but at the same time entails a large loss of material and therewith increased material costs.

Another known method of solving the problem of crack formation has taken as a starting point the controlling of the folding of the packaging material with the aid of suitably placed bend lines in such a way that the folding of the material can be done with less strain for the Al foil. But this solution has proved to be very difficult to carrry out in practice.

SUMMARY AND OBJECTS OF THE INVENTION

An aim of the present invention is therefore to indicate a new solution to the problem of crack formation described, without consequent drawbacks of the type that has been associated with the above described previous known solutions.

This aim is achieved according to the present invention through the fact that a packaging material of the type described in the introduction is given the characteristic that the material in the layer of binding agent is compressible.

The advantage in using a compressible layer of binding agent between the skeletal layer and the Al foil, i.e. on the inside of the Al foil reckoned in the direction of folding of the packaging material in the area where double or multiple layers of materials have to be folded along two crossing fold lines, is that the tensile forces to which the Al foil is exposed can be absorbed by the layer of binding agent on the inside through compression of this layer instead of stretching or acting upon the not very elastic Al foil. The compression of the layer of binding agent entails that the Al foil on the outside is moved nearer the center of fold, which further contributes to reducing the tensile forces acting on the Al foil. In addition the use of a compressible layer of binding agent entails that the thickness of the Al foil can be made thinner in the packaging material according to the invention than was earlier possible in known packaging material with a corresponding layer of binding agent of incompressible material, e.g. polyolefin.

Further advantageous and practical embodiments of the packaging material according to the invention have further been given the characteristics mentioned in the sub-claims below.

BRIEF DESCRIPTION OF THE DRAWINGS

The invention will be described in greater detail below with particular reference to the enclosed drawing in which FIG. 2 is a cross section which explains schematically the composition of a packaging material according to the invention, FIG. 1 is a cross section which explains schematically the composition of a packaging material of known type.

DETAILED DESCRIPTION OF PREFERRED EMBODIMENTS

Figure 3:
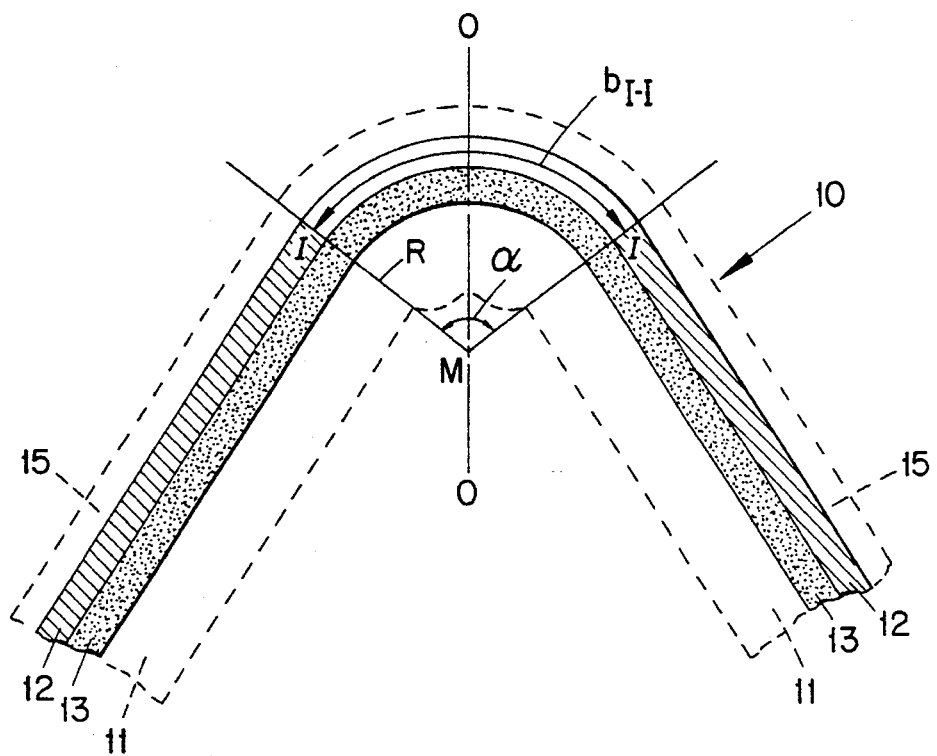
FIG. 3 shows schematically the process in folding of the packaging material in FIG. 1.

FIG. 1 thus shows schematically the composition of a classical example of a packaging material of the type described in the introduction which is often used in packagings for products sensitive to oxidation and storage of the type such as juice, wine, edible oil etc. The known packaging material which has been given the general reference designation 10 comprises a skeletal layer 11 of paper or cardboard and also a layer 12 of a material with good gas-tight properties applied to one side of the skeletal layer. The gas barrier layer 12 consists in the embodiment shown of a thin Al foil with a thickness of c. 7 μm. The Al foil is bound with good adhesion to the skeletal layer 11 with the aid of an intermediate layer of binding agent 13 which for example can consist of polyolefin, preferably polyethylene. Against the outside of the material 10 further layers 14 and 15 respectively of plastic, preferably polyethylene, are further applied.

It should be observed that the structure of the known packaging material 10 in FIG. 1 is correct as far as concerns the mutual placing of the respective layers of material, but on the other hand not to scale as far as concerns the relative thickness of the layers of material. In a practical example of the packaging material 10 for example the outer polyethylene coating 14 has a thickness of c. 11–14 μm, while the paper or cardboard layer 11 has a thickness of c. 175–275 μm. Further the layer of binding agent 11 has a thickness of c. 25–28 μm and the Al foil as previously mentioned a thickness of c. 6–8 μm. The outer polyethylene coating 15 is most frequently much thicker than the second outer polyethylene coating 14 and has usually a material thickness of c. 38–42 μm.

FIG. 2 shows schematically the composition of a packaging material according to the invention which structurally is very similar to the known material in FIG. 1. In order to gain in clarity therefore the same reference designations have therefore been used for the corresponding layer of material as in FIG. 1, but with the initial digit 2. The packaging material which is thus given the general reference designation 20 comprises a skeletal layer 21 of paper or cardboard and a layer 22 of a material with good gas barrier properties applied to one side of the skeletal layer. The gas barrier layer 22 consists, as in the foregoing known example, of an Al foil with a thickness of c. 7 μm. The Al foil is bound with good adhesion to the skeletal layer 21 with the aid of an intermediate layer 23 which according to the invention must be compressible as previously explained. The material 20 has further an outer plastic coating 24 of polyethylene against the other side of the skeletal layer 21 and an outer plastic coating 25 of ethylene covering the Al foil.

The compressible layer of binding agent 23 consists preferably of an expanded or foamed polyolefine material, e.g. polyethylene. Other examples of layers of binding agent which can be used in the material 20 according to the invention are foamed or expanded copolymers of ethylene, e.g. ethyl acrylic acid (EAA) or ethyl methyl acrylic acid (partly neutralised) which is an ionomer with the known trade name SURLYN. The compressibility of the layer of binding agent 23 is determined among other things by the void fraction in the layer, i.e. the proportion of cells or cavities relative to the total volume of the layer, likewise the form and orientation of the cells or cavities. With decreased void fraction the compressibility of the layer of binding agent decreases and in order to give the desired degree of compressibility it has been shown according to the invention that the void fraction should be at least 50%, preferably 70% or more. Further the cells or cavities should be lengthwise, i.e. exhibit a high ratio between length and width, and most of all be located centrally in the layer and orientated in such a way that the long parts of the cells or cavities are essentially parallel to each other and aligned transversely, preferably at right angles to a line along which the packaging material is intended to be folded during shaping into a packaging container.

The thicknesses of the respective layers of material forming part of the material 20 can for example be the following. The outer plastic coating 24 has a thickness of c. 13 μm, while the paper or cardboard layer 21 has a thickness of c. 175–275 μm. The layer of binding agent 23 can have a thickness of c. 25–30 μm and the Al foil 22 has as already mentioned a thickness of c. 6–7 μm. The outer plastic coating 23 wholly covering the Al foil has a thickness of c. 40 μm.

A layer of binding agent 23 of expanded or foamed polyolefin, e.g. polyethylene, is produced according to the invention preferably through an extrusion process with the use of a chemical blowing agent with the capacity to develop $CO_2$ gas, e.g. blowing agents known in this field of the types such as bicarbonate and citric acid. Alternatively the compressible polyolefine layer can be produced with the use of a physical blowing agent of gas type, e.g. freon.

FIG. 3 explains schematically the process in single folding along a plane of symmetry which is marked with the dotted line 0—0. In order to gain in clarity in the interpretation of FIG. 3 only certain layers of material forming part of the material 10, the layer of binding agent 13 and the Al foil 12 have been specially marked with full lines, while the material in general is shown with dotted lines. In the example shown it is assumed that the material is folded at an angle α, e.g. 180°, and that the folding is done along a line with the Al foil 12 placed against the side of the skeletal layer 11 which is facing away from the center of the fold M, i.e. a folding process during which the Al foil is exposed to tensile stresses.

During bending, as can be seen from FIG. 3, the material 10 will be folded along an evenly curved fold angle around the center line 0—0, wherewith the Al foil 12 follows a practically circular arc b I—I between the two end points of the curve I, I. The distance the Al foil is compelled to cover during the folding (the length of the arc b I—I) here amounts to α/360×2R, where R is the length of the distance I-M (the radius of curve).

Figure 4:
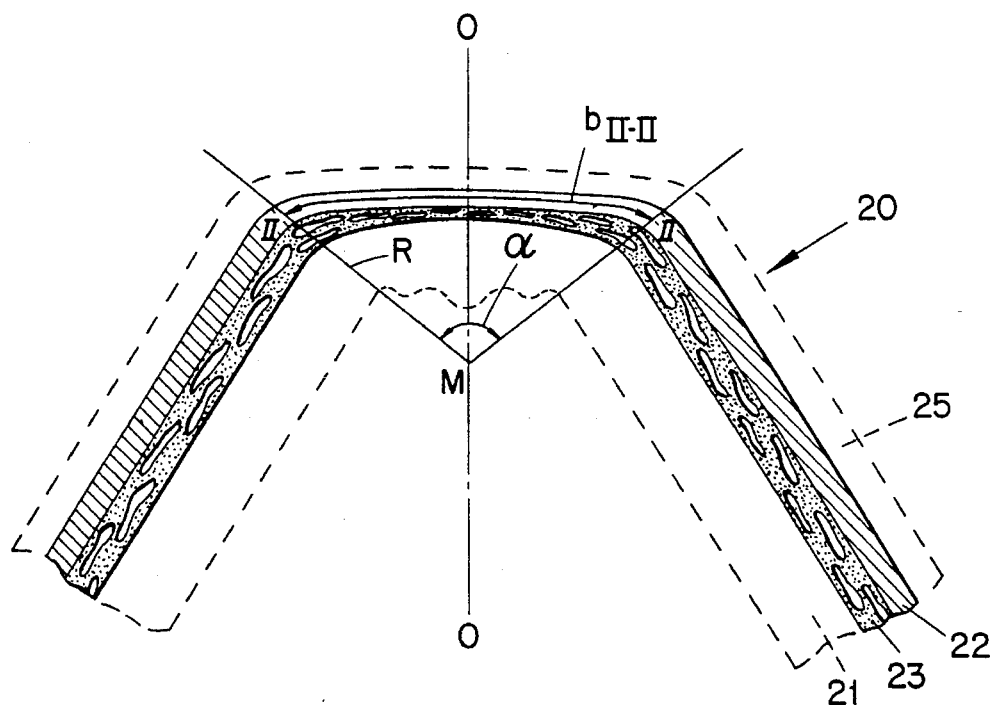
FIG. 4 shows a corresponding folding of the known packaging material in FIG. 2.

FIG. 4 shows in a corresponding mmanner the process in folding of the packaging material 20 according to the invention. The material 20 is thus folded through a total folding angle around a central plane of symmetry which is schematically indicated by the dotted line 0—0. In order to avoid the interpretation of FIG. 4 only certain layers forming part of the material are specially marked with full lines precisely as in FIG. 3, i.e. the Al foil 22 and the layer of binding agent 23, while the remaining layers have only been shown schematically with dotted lines. In FIG. 4 it is assumed that the material is folded along a line with the Al foil placed against the side of the skeletal layer 21 which faces away from the center of the fold M.

Through the fact that the layer of binding agent 23 is compressible this layer will during the folding absorb the tensile forces acting on the Al foil outside it and be compressed and, together with the Al foil and also the layer placed outside the foil, follow a practically straight line between the bends of the fold. The distance the Al foil is forced to cover during folding thus corresponds to the length of the distance b II—II between the end points of the fold II and II and can with simple geometric relationships be calculated from the formula b II—II=2R×sine α/2.

With comparison of the two packaging materials shown it is thus found that the Al foil 12 in the known material 10 is forced through a longer fold distance b I—I than the Al foil 22 in the material 20 according to the invention and that the Al foil 22 will thus be exposed to lower tensile stresses in comparable folds of the material 20. In, for example, a fold of the material through an angle of fold α=180° the fold distance b I—I for the Al foil 11 in the known material 10 will be 57% longer than the fold distance b II—II for the Al foil 21 in the material 20 according to the invention, which in its turn entails that the Al foil 21 in the material 20 according to the invention is to a corresponding degree less exposed to tensile stresses and can therefore be folded with less risk of crack formation or bursts.

In accordance with the present invention the previously described problem of crack formation can thus effectively be solved with the aid of the compressible layer of binding agent which absorbs in itself and thereby relieves the Al foil from too great tensile stresses when the material is folded with the Al foil placed on the side of the skeletal layer which faces away from the center of the fold. With the aid of the material according to the invention it is thus possible through shaping of the material by folding to produce packaging containers with good gas barrier properties and other sealing properties, e.g. impenetrability to light, desirable for products sensitive to oxidation and storage of the type such as juice, wine, edible oil etc.,

What is claimed is:

1. Packaging material with good gas barrier properties comprising:
    a skeletal layer of paper or cardboard,
    a gas barrier layer of a material with low elasticity which is placed against one side of the skeletal layer and is bound to the skeletal layer, and
    a layer of compressible binding agent placed between the skeletal layer and gas barrier layer, said layer of compressible binding agent having cells or cavities that exhibit a high ratio between length and width, are located centrally in the layer of compressible binding agent, are oriented so that the long parts of the cells or cavities are centrally parallel to each other, and are aligned at right angles to a line along which the packaging material is intended to be folded during shaping into a packaging container, wherein the proportion of cells or cavities relative to the total volume of the layer of compressible binding agent is at least 50%,
    whereby upon bending, the cells or cavities of the compressible binding agent at least partially collapse and relieve tension on the gas barrier layer.

2. Packaging material according to claim 1 wherein the compressible material is a foamed or expanded plastic material.

3. Packaging material according to claim 2 wherein the plastic material is polyolefinic.

4. Packaging material according to claim 1 wherein the layer of binding agent is extruded.

5. Packaging material according to claim 1 wherein the gas barrier layer is an aluminum foil.

6. Packaging material according to claim 5 wherein the aluminum foil has a thickness of about 6–8 μm.

7. Packaging material according to claim 1 wherein the gas barrier layer is covered with a layer of thermoplastic.

8. Packaging material according to claim 7 wherein the layer of thermoplastic is polyethylene.

9. Packaging material according to claim 7 wherein the layer of thermoplastic is extruded.

10. Packaging container produced by a process comprising the steps of shaping through folding and sealing of a packaging material according to claim 1.

11. Packaging material according to claim 1 wherein the proportion of cells or cavities relative to the total volume of the layer of compressible binding agent is at least 70%.

12. Packaging material according to claim 1 wherein the cells or cavities are closed.

13. A packaging material for making packages requiring bending of the material in the formation of the package, comprising:

(a) a paper or cardboard layer having an outer surface and an inner surface;
    (b) a gas barrier layer or aluminum foil spaced from the inner surface;
    (c) an intermediate layer of a foamed or expanded polyolefin material having a void fraction of at least 50%, comprising cells or cavities that exhibit it high ratio between length and width, are located centrally in the intermediate layer, are oriented so that the long parts of the cells or cavities are centrally parallel to each other, and are aligned at right angles to a line along which the packaging material is intended to be folded during shaping into a packaging container, said intermediate layer being between the gas barrier layer and the inner surface of the paper or cardboard layer;

(d) an outer polyethylene coating on the outer surface of the paper or cardboard layer; and (e) a polyethylene coating on the gas barrier layer; upon bending, the voids in the intermediate layer at least partially collapse and tension on the gas barrier layer.

14. Packaging material with good gas barrier properties comprising:

a skeletal layer of paper or cardboard, a gas barrier layer of a material with low elasticity which is placed against one side of the skeletal layer and is bound to the skeletal layer, and a layer of compressible binding agent with a thickness in the range of about 25–30 μm placed between the skeletal layer and gas barrier layer, said layer of compressible binding agent having cells or cavities that exhibit a high ratio between length and width, are located centrally in the layer of compressible binding agent, are oriented so that the long parts of the cells or cavities are centrally parallel to each other, and are aligned at right angles to a line along which the packaging material is intended to be folded during shaping into a packaging container, wherein the proportion of cells or cavities relative to the total volume of the layer of compressible binding agent is at least 50%, whereby upon bending, the cells or cavities of the compressible binding agent at least partially collapse and relieve tension on the gas barrier layer.

15. Packaging material with good gas barrier properties comprising:

a skeletal layer of paper or cardboard, a gas barrier layer of aluminum foil which is placed against one side of the skeletal layer and is bound to the skeletal layer, and a layer of compressible binding agent that is a foamed or expanded plastic material, having a thickness in the range of about 25–30 μm placed between the skeletal layer and gas barrier layer, said layer of compressible binding agent having closed cells or cavities that exhibit a high ratio between length and width, are located centrally in the layer of compressible binding agent, are oriented so that the long parts of the cells or cavities are centrally parallel to each other, and are aligned at right angles to a line along which the packaging material is intended to be folded during shaping into a packaging container, wherein the proportion of cells or cavities relative to the total volume of the layer of compressible binding agent is at least 50%, whereby upon bending, the cells or cavities of the compressible binding agent at least partially collapse and relieve tension on the gas barrier layer.

* * * * *